United States Patent [19]

Forberg et al.

[11] 4,345,294

[45] Aug. 17, 1982

[54] OVERVOLTAGE-ARRESTER DEVICE FOR TERMINAL- OR JUNCTION BLOCKS IN TELECOMMUNICATION EQUIPMENT

[75] Inventors: Horst Forberg; Klaus-Peter Achtnig, both of Berlin, Fed. Rep. of Germany

[73] Assignee: Krone GmbH, Berlin, Fed. Rep. of Germany

[21] Appl. No.: 237,382

[22] Filed: Feb. 23, 1981

[30] Foreign Application Priority Data

Apr. 17, 1980 [DE] Fed. Rep. of Germany ....... 3014796

[51] Int. Cl.[3] ............................................. H02H 1/04

[52] U.S. Cl. ....................................... 361/119; 179/98

[58] Field of Search ............... 361/119, 427, 426, 393, 361/394, 396; 179/98; 339/198 S, 198 P, 198 G

[56] References Cited

FOREIGN PATENT DOCUMENTS 1810175 6/1970 Fed. Rep. of Germany ... 339/198 G 2750638 5/1979 Fed. Rep. of Germany ...... 361/119

*Primary Examiner*—Reinhard J. Eisenzopf

*Attorney, Agent, or Firm*—Brown & Martin

[57] ABSTRACT

In this overvoltage arrester device which takes the form of a plug-in-type insulation box (1) comprising a box top (1*b*) and a box base (1*a*) and in each case adapted to accomodate a plurality of laterally adjacent overvoltage arresters (4*a*,4*b*), the housing or box (1) is assembled from a lower part or base (1*a*) which is identical for all kinds of application, and one of two types of box tops (1*b*) depending on the envisaged application, the box tops (1*b*) being adapted to be plugged or snapped into the box base (1*a*) and being fitted with knife-switch prongs (2*a*,2*b*) and earth bars (3*a*,3*b*) of different configuration depending on envisaged application in such a manner as to enable a double row of arresters of different types being accomodated in the box.

8 Claims, 5 Drawing Figures

OVERVOLTAGE-ARRESTER DEVICE FOR TERMINAL- OR JUNCTION BLOCKS IN TELECOMMUNICATION EQUIPMENT

This invention relates to an overvoltage arrester device for terminal or junction blocks in telecommunication equipment designed in the form of a plug-in-type housing of insulating material adapted in each case to accomodate a plurality of laterally adjacent overvoltage arresters and assembled from upper and lower housing parts, and has for its aim to provide a device of this kind which can be economically massproduced to meet the existing high demand.

An overvoltage arrester or protector device for terminal or junction blocks in telecommunication equipment is already known (German OS No. 27 50 638). The voltage surge arresters there used are particularly well suited for contacting by means of crown contacts. These arresters have an 8 mm diameter.

However, other types of arresters, such as for example 6×8, 8×8 and twin arresters which have three contact pins, are also increasingly required for the same terminal blocks.

The known overvoltage arrester devices are not capable of accommodating arresters of this type.

It is therefore the aim of the present invention to construct a new arrester device for conventional terminal or junction blocks which has the economic advantage of utilising an already existing insulation box base which has been fully described by the applicants in their German OS No. 27 50 638.

According to the present invention the stated aim is achieved due to the fact that the housing comprises an insulation box base and, depending on the envisaged application, one of two different types of insulation box tops which are adapted to be plugged into the base and equipped with knife-switch prongs and earth bars of relatively different configuration, and that it is so designed as to permit relatively different types of arresters being fitted therein.

Further advantageous developments in respect of individual provisions according to this invention are characterised in the subclaims.

Figure 1:
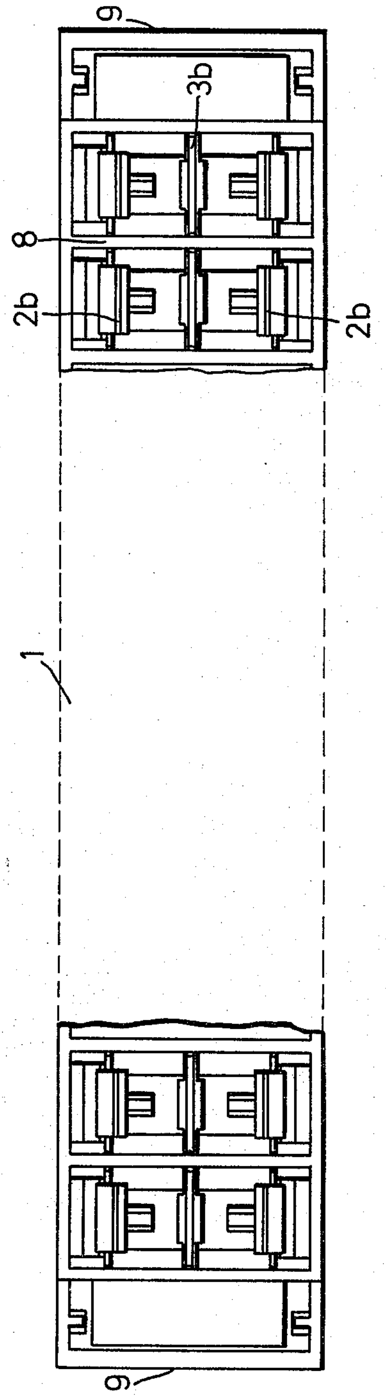
Figure 2:
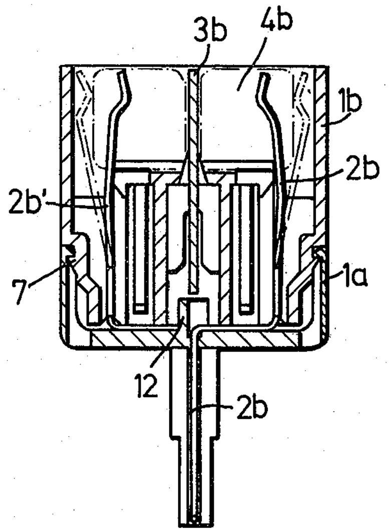
Figure 2A:
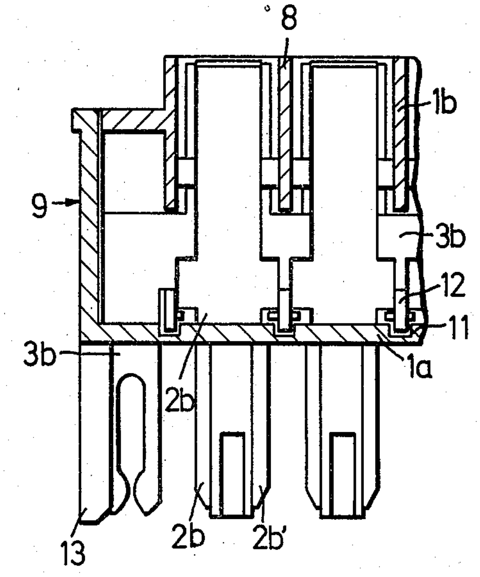
Figure 3:
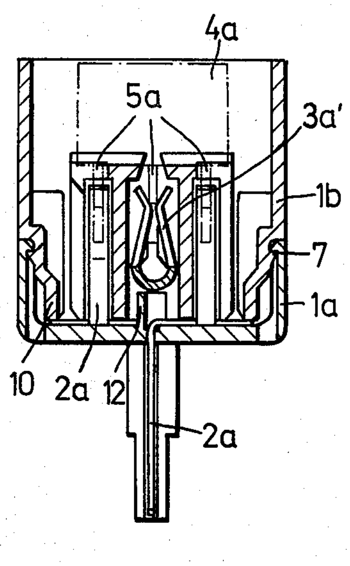
Figure 3A:
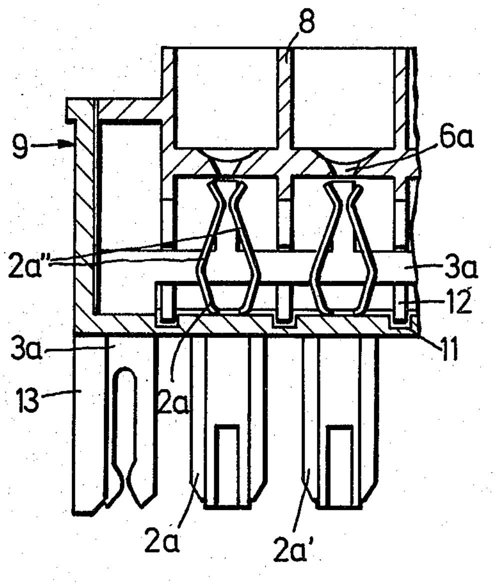

An embodiment of the invention is illustrated by way of example in the accompanying drawings wherein:

FIG. 1 is a top or plan view of the overvoltage-arrester device (magazine) showing only the left and right hand sides thereof, FIG. 2 is a cross section through the housing of the overvoltage arrester device showing the appropriate knife-switch prongs and earth bar for the installation of 8×8 and 6×8-type arresters, FIG. 2*a* is a lateral view, in section, corresponding to FIG. 2, FIG. 3 is a cross section through the housing of the overvoltage arrester device showing appropriate knife-switch prongs and earth bar for the installation of twin arresters, FIG. 3*a* is a lateral view in section corresponding to FIG. 3.

As shown in FIGS. 2 and 3, a housing or top box **1*b* is adapted to be plugged into the known box base 1*a* by means of the snapfit means 7**.

The box top **1*b* is adapted to be equipped with different kinds of knife-switch prongs 2*a*,2*b* thus allowing arresters of different types being installed in the box 1**.

FIGS. 1, 2 and **2*a* show that for use with standard commercial 6×8 and 8×8 arrester elements 4*b* the matching knife-switch prongs 2*b* ,2*b*' and earth bar 3*b* are fitted in the insulation box 1**.

More particularly, FIG. 2 shows that when the arresters **4*b* are fitted the knife-switch prong or contact blade 2*b*, 2*b*' is slightly bent open (dotted lines) thus enabling the arresters 4*b* being securely clipped in place, and thus contacted, white being easily exchangeable. FIG. 2 further shows that the arresters 4*b* which are arranged in a double row, are contacted between the earth bar 3*b* which extends centrally in the housing 1 and the switch prong 2*b* or 2*b*'** respectively.

FIGS. 3 and **3*a* show that for use with a standard commercial twin arrester elements 4*a* the insulation box 1 is equipped with knife-switch prongs 2*a*,2*a*' and earth-bar 3*a***.

The conventional twin arrester **4*a* normally has three pins 5*a***

Two of these pins **5*a* are slotted in two juxtaposed contact blades or prongs 2*a*,2*a*' while the middle pin 5*a* of the arrester 4*a* is slotted into the earth bar 3*a*, which operation causes the spring arms 2*a*'' of the knife-switch 2*a* and the spring arms 3*a*' of the earth bar 3*a*** to bend open.

The pins **5*a* of the arrester 4*a* are passed through holes 6*a* in the box top 1*b***.

As shown in FIGS. **2*a* and 3*a* the box top 1*b* of the insulation box 1 is designed in the form of a chambered or grid-like frame which is open on the top and bottom sides thereof and comprises a plurality of partitions 8 which extend parallel to the end walls 9**.

Clearances, or recesses 11 in the base part **1*a* and fins 12 on the box top 1*b*** are provided for an extension of creepage tracks.

The knife-switch prongs or blades **2*a*,2*a*' for twin arresters 4*a* are supported by a longitudinally extending shoulder 10 formed integrally at the underside of the box top 1*b***.

The end walls 9 of the box 1 are provided with guide means 13 for the earth bar **3*a* or 3*b*, as shown in FIGS. 2*a* and 3*a***.

We claim:

1. A modular exchangeable overvoltage arrester device for terminal or junction blocks in telecommunication equipment, said device being adapted to accommodate a plurality of different laterally adjacent overvoltage arresters, said device comprising:

- a plug-in-type housing of electrically insulating material comprising:
  - a housing base;
  - a housing top removably attachable to said housing base;
  - a plurality of contact blades projecting from said housing for making external electrical interconnections;
  - said housing top being shaped and configured to selectively receive a plurality of different switch prongs and earth bars thereby forming different versions of said housing, each such version being adapted to receive a distinct configuration of arrester elements;
- a first of said housing versions being adapted to receive standard commercial 6×8 and 8×8 arrester elements and comprising:
  - a plurality of spring loaded single blade first switch prongs arranged in two confronting rows adjacent the sides of said housing top; and a first earth bar positioned between said rows of first switch prongs;

said first switch prongs and said earth bar being configured and adapted to engagingly hold said arresters therebetween in opposite pairs, one on either side of said first earth bar, thereby making appropriate electrical contact with said first switch prongs and said first earth bar;

a second of said housing versions being adapted to receive standard commercial twin arresters, each of said arresters having three pins projecting from the bottom thereof, said second housing comprising:

a plurality of second switch prongs comprised of pairs of juxtaposed spring blades arranged in two confronting rows adjacent the sides of said housing top; 2 a second earth bar positioned between said rows of said second switch prongs; and a plurality of spring arm pairs mounted to said second earth bar;

each of said second switch prong pairs being adapted to engagingly hold one of the pins of said twin arrester, there being two of said second switch prong pairs for each said twin arrester thereby electrically contacting two of the pins of said twin arrester, each of said spring arm pairs being adapted to engagingly hold the third pin of said twin arrester, thereby making positive electrical ground contact;

each of said first and second switch prongs and each of said earth bars being connected to one of said externally projecting contact blades.

2. The arrester device recited in claim 1 wherein said housing top is formed with a lateral platform having openings therethrough, which in said second housing version provides said openings for each said twin arrester through which said pins extend to engage said second switch prongs, said switch prongs and spring arms being positioned below said lateral platform.

3. The arrester device recited in claim 2 wherein said arrester elements rest upon said platform.

4. The arrester device recited in either of claims 2 or 3 wherein:

said lateral platform is discontinuous; and in said first version said first switch prongs and said first earth bar extend upwardly past said lateral platform to engage the sides of said arrester elements.

5. The arrester device recited in claim 1 and further comprising cooperative snap fit means on said housing base and on said housing top whereby said housing top is selectively removably attachable to said housing base to facilitate conversion of said housing from one version to another.

6. The arrester device recited in claim 1 wherein:

said housing top is formed as a chambered frame structure, each chamber being open at the top and bottom, said chambers being defined laterally by means of a plurality of transverse partitions; and said housing base is formed with transverse walls at each end thereof, said partitions being parallel with said end walls.

7. The arrester device recited in either of claims 1 or 6 wherein said housing base is formed with a plurality of transverse clearances and said housing top is formed with a like plurality of downwardly projecting fins adapted to be seated in said clearances for an extension of creepage tracks.

8. The arrester device recited in claim 1 wherein said housing top is formed on its lower portion with longitudinally extending shoulders on either side to provide support for said switch prongs.

* * * * *

UNITED STATES PATENT AND TRADEMARK OFFICE

CERTIFICATE OF CORRECTION

PATENT NO. : 4,345,294

DATED : August 17, 1982

INVENTOR(S) : Horst Forberg and Klaus-Peter Achtnig

It is certified that error appears in the above-identified patent and that said Letters Patent are hereby corrected as shown below:

Column 3, Claim 1, line 17, after the word "top" delete "2".

Signed and Sealed this

*Twenty-sixth* Day of *October 1982*

[SEAL]

*Attest:*

GERALD J. MOSSINGHOFF

*Attesting Officer* *Commissioner of Patents and Trademarks*